Patented June 28, 1949

2,474,793

UNITED STATES PATENT OFFICE 2,474,793

PLASTICIZED ELASTOMER COMPOSITIONS CONTAINING N-(HYDROXYALKYL)-AMIDES AND THEIR FATTY ACID ESTERS

Philip F. Tryon, Terre Haute, Ind., assignor to Commercial Solvents Corporation, Terre Haute, Ind., a corporation of Maryland No Drawing. Application January 8, 1945, Serial No. 571,965

4 Claims. (Cl. 260—32.2)

This invention relates to plasticized elastomer compositions and more particularly to such compositions in which so-called synthetic rubbers are plasticized or softened with softening agents of the class of N-(hydroxyalkyl) amides of lower fatty acids and their fatty acid esters, the N-(alkanecarbonyloxyalkyl) amides.

In the manufacture and compounding of rubber and synthetic rubber, it is necessary to bring the compound into a plastic state so that pigments, fillers, and the like can be incorporated therein, and so that the product can be molded into the desired shape before vulcanizing. In the case of natural rubber, simple heating by the friction of milling on a roller mill induces the necessary degree of plasticity for these purposes.

The so-called synthetic rubbers or synthetic elastomers on the other hand do not respond easily to milling treatment and often become hard and brittle or crumble when subjected to such milling. It is, therefore, essential to add to many of the synthetic elastomers softening or plasticizing agents to facilitate satisfactory milling and forming operations.

It is desirable that such softeners not only plasticize the elastomer, but that they shall not seriously decrease the tensile strength and stretching capacities of the plasticized material.

I have found that N-(hydroxyalkyl) and N-alkanecarbonyloxyalkyl) amides of lower fatty acids are excellent plasticizers for synthetic elastomers and impart their beneficial softening properties without damage to the tensile strength and elongation characteristics of the resulting composition, in many cases actually enhancing one or the other or both of these characteristics to some extent.

The amides utilizable as softening agents in my invention may be represented by the following structural formula

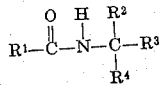

in which $R^1$ represents an alkyl radical having from 1 to 5 carbon atoms, $R^2$ represents a substituent selected from the group consisting of hydroxymethyl and $-CH_2-O-CO-CH_3$, $R^3$ is a substituent selected from a group consisting of hydrogen and methyl and $R^4$ is a substituent selected from the group consisting of ethyl and $-CH_2-O-CO-CH_3$.

The softening agents of my invention may be employed in conjunction with any of the synthetic rubbers prepared by polymerization of 1,3-butadiene alone or copolymerized with other polymerizable monomers, which contain the polymerizable structure $H_2C=C<$, among which may be mentioned the aryolefins such as styrene and vinyl naphthalene; the alpha-methylene carboxylic acids and their esters, nitriles and amides such as acrylic acid, methyl acrylate, methyl methacrylate, acrylonitrile methacrylonitrile, methacrylamide, isobutylene, methyl vinyl ether and so on. My softening agents are especially effective when utilized with butadiene-acrylonitrile copolymers, which are generally recognized as among the most difficult of the elastomers to plasticize.

Among the compounds coming within the scope of my invention may be mentioned the following: 2-formamido-1-butanol; 2-acetamido-1-butanol; 2-butanamido-1-butanol; 2-hexanamido-1-butanol; 2-acetamido-2-methyl-1-propanol; 2-acetamido-2-methyl-1,3-propanediol; acetotris(hydroxymethyl)methylamide; 2-acetamidobutyl acetate; 2-acetamido-2-methyl-1,3-propanediol diacetate, and the like.

The hydroxyalkyl substituted amides and their esters described may be prepared for example by the following procedure: The calculated amount of fatty acid anhydride, for amide or ester formation as desired is added to an equivalent quantity of a primary amino hydroxy compound based on its neutralization equivalent and the resultant mixture heated, for example on a steam bath, for a period of about two hours. At the end of this time the low boilers may be stripped off with a vacuum pump, and the residue recovered as the N-substituted amide, the yields varying from approximately 85% to 100%. The crude product thus prepared is usually sufficiently pure for satisfactory use as a plasticizer in the various synthetic elastomers, but if desired it may be further purified by vacuum distillation or otherwise. The compounds covered by this generic formula also can be prepared, in general, by other methods well known to the art. For instance, they may be prepared by the action of a fatty acid chloride, in a suitable medium, on the aminohydroxy compound. The N-(hydroxyalkyl) amides often can be prepared by reaction, in the known manner, of a fatty acid ester on the aminohydroxy compound, or by a direct controlled reaction of the fatty acid itself on the aminohydroxy compound.

The amount of plasticizer utilized will vary with the relative difficulty of plasticization of the particular elastomer involved and with the degree of softness desired. In general, such softeners can be employed in a wide range of proportions, and preferably within the range of concentrations varying from about ten to forty-five parts by weight of plasticizer for each 100 parts by weight of elastomer.

The plasticizers of my invention all impart a high degree of plasticity to elastomer compositions, without seriously reducing the tensile strength and elongation factors.

A convenient method for evaluating the effectiveness of plasticizing compositions comprises milling the composition in a standard rubber formula on a conventional rubber mill, and then measuring the extrusion time at various pressures in an extrusion plastometer, for example, in an instrument and according to a method similar to that described by J. H. Dillon in "Rubber Chemistry and Technology," vol. 9, pp. 496–501 (July 1936). In order to evaluate the effect of the plasticizer on the tensile and elongation properties of the elastomer, samples of the sheet are tested for these factors in the standard Scott tensile tester.

As illustrative of my invention, tensile, elongation, and extrusion values as measured by the instruments above referred to, were run on several representative amides of the class described. The plasticizer was added in each case in the indicated amount to the standard formula given below, and milled into the stock in the conventional manner.

*Test composition*

| | Parts by weight |
|---|---|
| Hycar OR (butadiene-acrylonitrile copolymer) | 100 |
| Zinc oxide | 5 |
| Stearic acid | 1 |
| Altax (benzothiazyl disulfide) | 1.5 |
| Sulfur | 1.5 |
| Carbon | 50 |
| Plasticizer | 30 |
| | 189.0 |

After milling, part of each sample was subjected to tensile and elongation tests, part was tested in the extrusion plastometer with the results given below:

*Table*

| Plasticizer | Tensile | Elong. | Extrusion Time in Seconds at— | |
|---|---|---|---|---|
| | | | 5½ lbs. | 7½ lbs. |
| Unplasticized batch | 2,280 | 247 | 738 | 210 |
| 2-Acetamidobutyl acetate | 3,560 | 357 | 34 | 18 |
| 2-Acetamido-2-methyl-1,3-propanediol diacetate | 3,400 | 410 | 8 | 3 |
| 2-Hexanamido-1-butanol | 2,240 | 365 | 12 | 3 |
| 2-Acetamido-1-butanol | 2,270 | 350 | 25 | 8 |
| Dibutyl phthalate (control) | 2,980 | 480 | 37 | 19 |
| Tricresyl phosphate (control) | 2,540 | 395 | 60 | 35 |

In the above table, a reduction in extrusion time indicates an increase in plasticity, that is the more "plastic" the composition the more rapidly will it extrude, at a given pressure. It will be observed, that in every case the plasticizing effects are striking, and are superior even to the controls, dibutyl phthalate and tricresyl phosphate, which are usually run in conjunction with such tests for comparison.

It will also be observed, that in general, the compositions show little or no loss in tensile and elongation over the original unplasticized batch, and in some cases, an increase in these characteristics is obtained.

While the above describes the preferred embodiments of my invention, it is to be understood that departures may be made therefrom within the scope of the specification and claims.

What is claimed is:

1. A composition comprising a synthetic rubber-like elastomer of the class consisting of 1,3-butadiene polymers and copolymers of butadiene polymerized with other monomers having the polymerizable structure $$H_2C=C<$$

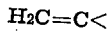

and 2-acetamido-2-methyl-1,3-propanediol diacetate the latter being present in plasticizing proportions.

2. A composition comprising a synthetic rubber-like 1,3-butadiene acrylonitrile copolymer and a quantity sufficient to effectively plasticize said copolymer of an N-substituted amide of the following structural formula

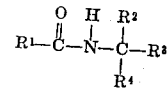

$$R^1-\overset{O}{\overset{\|}{C}}-\overset{H}{\overset{|}{N}}-\overset{R^2}{\overset{|}{\underset{R^4}{C}}}-R^3$$

wherein $R^1$ represents an alkyl radical having from 1 to 5 carbon atoms, $R^2$ represents a substituent selected from the group consisting of hydroxymethyl and $-CH_2-O-CO-CH_3$, $R^3$ is a substituent selected from a group consisting of hydrogen and methyl and $R^4$ is a substituent selected from the group consisting of ethyl and $-CH_2-O-CO-CH_3$.

3. The composition of claim 2 wherein the N-substituted amide is 2-acetamido-1-butanol.

4. The composition of claim 2 wherein the N-substituted amide is 2-hexanamido-1-butanol.

PHILIP F. TRYON.

REFERENCES CITED

The following references are of record in the file of this patent:

UNITED STATES PATENTS

| Number | Name | Date |
|---|---|---|
| 2,250,664 | Watkins | July 29, 1941 |
| 2,284,609 | Schroy | May 26, 1942 |
| 2,325,947 | Garvey | Aug. 3, 1943 |

OTHER REFERENCES

Karrer, Organic Chemistry, "Elsevier," Nordeman Publishing Company, Inc., New York, New York (1938), page 181. (Copy in Division 50.)

Ind. & Eng. Chem., article by Fisher, pages 941–945, vol. 31, No. 8, August 1939. (Copy in Division 50.)